United States Patent Office 3,137,718
Patented June 16, 1964

3,137,718
PREPARATION OF ETHYNYL SILANES
Herbert Jenkner, Hannover-Wulfel, Germany, assignor to Kali-Chemie Aktiengesellschaft, Hannover, Germany
No Drawing. Filed Sept. 25, 1959, Ser. No. 842,184
Claims priority, application Germany Sept. 27, 1958
9 Claims. (Cl. 260—448.2)

The invention relates to a process for the preparation of ethynyl silanes, and to compositions useful in such process.

Said ethynyl silanes are prepared from silicon chloride compounds of the formula $R^1R^2R^3SiCl$ wherein $R^1$, $R^2$, $R^3$ are the same or different hydrocarbon radicals. In the conversion to the corresponding ethynyl compounds, only the Cl atom of a chlorinated silane used as starting material is replaced by the ethynyl group. The hydrocarbon radical does not enter the reaction and is carried unchanged into the final product. Therefore, they may be any saturated or unsaturated aliphatic or aromatic hydrocarbon radical.

When attempts are made to introduce the ethynyl group in the $R_3SiCl$ compounds by reaction with an alkali metal acetylide, the yields are so low that the reaction is unsuitable for commercial production.

I have found that ethynyl silanes can be produced in high yields when sodium acetylide is not employed as such but in the form of its addition compound with aluminum or boron trialkyl. Said compounds are readily obtained by reacting the components in stoichiometric amounts in a suitable solvent in an oxygen-free atmosphere, for instance, according to the equations (1) $NaC{\equiv}CH + Al(C_2H_5)_3 \rightarrow NaC{\equiv}CH \cdot Al(C_2H_5)_3$
(2) $NaC{\equiv}CH + B(C_2H_5)_3 \rightarrow NaC{\equiv}CH \cdot B(C_2H_5)_3$ Suitable solvents are ethers but high boiling mineral oils, paraffin oils, or hydrocarbons may also be used as reaction medium. I prefer to use as solvent a dialkyl ether, the alkyl group of which has 3 to 4 carbon atoms, or a dialkyl ether of diethyleneglycol, the alkyl group of which has 1 to 2 carbon atoms.

The reaction of said addition compounds with a chlorinated silane proceeds readily according to the equations (3) $R_3SiCl + NaC{\equiv}CH \cdot Al(C_2H_5)_3 \rightarrow$
$R_3SiC{\equiv}CH + NaCl + Al(C_2H_5)_3$
(4) $R_3SiCl + NaC{\equiv}CH \cdot B(C_2H_5)_3 \rightarrow$
$R_3SiC{\equiv}CH + NaCl + B(C_2H_5)_3$ As the equations show, the aluminum and boron trialkyls do not take part in the reaction with the chlorosilane; they are split off and available for recombination with fresh sodium acetylide. It is, therefore, not necessary to carry out the reaction with the preformed sodium acetylide-aluminum or boron trialkyl but it is sufficient to react the sodium acetylide with the monochlorinated silane in the presence of said compounds, which reaction may then be illustrated by the equations

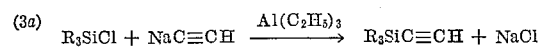

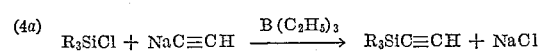

These equations show that it is not necessary to apply stoichiometric amounts of the trialkyl aluminum or boron; much smaller amounts, such as 5 to 25 percent of the stoichiometric amount, calculated on the sodium acetylide, allow to obtain the ethynyl silane in good yields.

The boron and aluminum trialkyls may also be used in form of their etherates or aminates. Instead of the ethyls, other alkyls, particularly alkyls having 1 to 4 C atoms, may be used. It is not necessary to use the trialkyls; one or two of the alkyl groups may be replaced by other groups such as alkoxy, aryl, or chlorine. In the case of boron, even boron triaryls are operative.

Though, I prefer to use the sodium acetylide as a cheap ethynylating compound, potassium acetylide may be employed in the same manner. The reaction is slightly exothermic. Preferred reaction temperatures in forming the addition compounds are 50 to about 120° C. The reaction with silicon chloride compounds is effected at about the same temperature. Preferably, the isolation of the ethynyl compounds is carried out by distillation, working under exclusion of air or, preferably, in the presence of nitrogen as shielding gas.

The following examples illustrate the invention. All parts are given by weight unless indicated otherwise.

Example 1

25 parts of sodium were suspended in 150 parts of dibutyl ether and reacted at 100° C. under stirring with acetylene. The obtained sodium acetylide was pure white and had a content of 99% $NaC{\equiv}CH$.

20 parts of said sodium acetylide were suspended in 140 parts of diethyleneglycol diethylether and reacted with 47.5 parts of aluminum triethyl at 95° C.

After distillation of the solvent, $NaC_2H \cdot Al(C_2H_5)_3$ was obtained as a colorless powder which decomposed in air without burning. The compound reacts vigorously with water and is soluble, for instance, in propylether, butylether, diethyleneglycol dimethylether.

Example 2

20 parts of sodium acetylide were suspended in 150 parts of paraffin oil and reacted with 7.5 parts of boron triethyl at 85° C.

There was obtained the addition compound

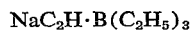

The product is at room temperature an amber colored brittle solid substance which is relatively stable in dry air but ignites in contact with water. It is soluble in the same ethers as the compound of Example 1 and also in benzene. It is only sparingly soluble in aliphatic hydrocarbons such as hexane.

Example 3

38.7 g. of trimethylchlorosilane were slowly added dropwise within 15 minutes to a solution of 67.5 parts of $NaC_2H \cdot Al(C_2H_5)_3$ in diethyleneglycoldiethylether at a temperature of 95° C. There were obtained 30 g. of trimethylethynylsilane $(CH_3)_3SiC{\equiv}CH$ of 90% purity, which was free of chlorine, and could be used directly as cross-linking agent in certain plastics. The products may be used as cross-linking agents in the plastics industry, e.g., in silicon coatings or polyester resins.

Example 4

36 parts of trimethylchlorosilane are added dropwise with vigorous stirring at a temperature of 85° C. to a suspension of 27.5 parts of $NaC_2H \cdot B(C_2H_5)_3$ in 150 parts of paraffin oil. There were obtained 24.5 parts of a colorless liquid, which contained 72.5% of trimethylethynyl silane.

Example 5

20 parts of $Al(C_2H_5)_3$ were added at 90° C. to a suspension of 8.4 parts of sodium acetylide in 100 parts of diethyleneglycoldimethylether, and subsequently 19 parts of dimethylvinylchlorosilane were slowly added at the same temperature to said batch. By vacuum distillation, 13.3 parts of dimethylvinylethynylsilane were obtained.

Example 6

33.3 parts of aluminum triethyl were added at 80° C. to a suspension of 13.9 parts of sodium acetylide in 140 parts of di-n-propylether. Subsequently, 44.7 parts of dimethylphenylchlorosilane were added to the batch at the same temperature.

Solvent and reaction product were distilled off from the sodium chloride containing residue under reduced pressure. From said distillate, 30.2 parts of dimethylphenylethynyl silane were recovered by vacuum distillation, corresponding to a yield of 72%. The product had a boiling point of 55 to 57° C. at 0.6 mm. Hg.

*Example 7*

20 parts of sodium acetylide were suspended in 140 parts of diethyleneglycoldiethylether. At a temperature of 95° C., there were added first 47.5 parts of aluminum triethyl and subsequently dropwise 38.7 parts of trimethylchlorosilane. 30 g. of trimethylethynylsilane (=90% of theory) were obtained.

The test was repeated under the same conditions of reaction with the sole difference that the aluminum triethyl was omitted, and 38.7 parts of trimethylchlorosilane were introduced directly into the suspension of sodium acetylide in diethyleneglycoldiethylether. 35.5 parts of a reaction product were obtained which contained still 26.5 percent of chlorine and only 17 percent of trimethylethynyl silane.

I claim:

1. A process for the preparation of ethynyl silanes comprising reacting at a temperature of about 50 to 120° C. in an oxygen-free atmosphere a monochlorinated hydrocarbon substituted silane with an addition compound of sodium acetylide with a member of the group consisting of $AlR_3$ and $BR_3$, R being alkyl having 1 to 4 carbon atoms, and distilling off the obtained ethynyl silane.

2. A process for the preparation of ethynyl silanes comprising reacting at a temperature of about 50 to 120° C. in an oxygen-free atmosphere an alkali metal acetylide and a silane according to the equation

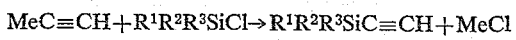

$$MeC \equiv CH + R^1R^2R^3SiCl \rightarrow R^1R^2R^3SiC \equiv CH + MeCl$$

wherein Me is alkali metal and $R^1$, $R^2$, $R^3$ are monovalent hydrocarbon radicals, in the presence of a member of the group consisting of $AlR_3$ and $BR_3$, R being alkyl having 1 to 4 carbon atoms, in an amount of at least about 5 mole percent, calculated on $MeC \equiv CH$, and recovering the obtained ethynyl silane.

3. The process claimed in claim 2, wherein the reaction is carried out in an inert organic solvent selected from the group consisting of ethers and hydrocarbons.

4. The process claimed in claim 3, wherein the solvent is a dialkylether, the alkyl group of which has 3 to 4 carbon atoms.

5. The process claimed in claim 3, wherein the solvent is a dialkyl ether of diethyleneglycol, the alkyl group of which has 1 to 2 carbon atoms.

6. The process claimed in claim 2, wherein sodium acetylide is used.

7. A process for the preparation of ethynyl silanes comprising reacting at a temperature of about 50 to 120° C. in an oxygen-free atmosphere an alkali metal acetylide and a monochlorinated hydrocarbon substituted silane in presence of an organoaluminum compound containing at least one alkyl group directly bound to aluminum, the remaining valences of the aluminum being linked to a member of the group consisting of alkyl, alkoxy, aryl, and chlorine.

8. A process for the preparation of ethynyl silanes comprising reacting at a temperature of about 50 to 120° C. in an oxygen-free atmosphere an alkali metal acetylide and a monochlorinated hydrocarbon substituted silane in presence of an organoboron compound $BR_3$ wherein R is a member of the group consisting of alkyl and aryl.

9. A process for the preparation of ethynyl silanes comprising reacting an alkali metal acetylide of the formula $MeC \equiv CH$, wherein Me is alkali metal, with a member of the group consisting of $AlR_3$ and $BR_3$, R being alkyl having 1 to 4 carbon atoms, to form an addition compound $MeC \equiv CH \cdot MR_3$ wherein M is a member of the group consisting of aluminum and boron, and adding to the reaction mixture, without recovering said addition compound, a monohalogenated hydrocarbon substituted silane.

References Cited in the file of this patent
UNITED STATES PATENTS

| | | |
|---|---|---|
| 2,823,218 | Speier et al. | Feb. 11, 1958 |
| 2,844,615 | Ziegler et al. | July 22, 1958 |
| 2,857,414 | Schmidt et al. | Oct. 21, 1958 |
| 2,887,371 | Bennett et al. | May 19, 1959 |
| 2,903,469 | Hawkins et al. | Sept. 8, 1959 |
| 2,945,874 | Jenkner | July 19, 1960 |
| 3,020,298 | Ashby et al. | Feb. 6, 1962 |

FOREIGN PATENTS

| | | |
|---|---|---|
| 1,044,082 | Germany | Nov. 20, 1958 |

OTHER REFERENCES

Hartman et al.: Zeitschrift für Anorganische und Allgemeine Chemie, vol. 276 (1954), pages 20–32.

Chemical Reviews, vol. 56, No. 5, October 1956, pages 1035–9.